United States Patent
Alexander

(10) Patent No.: US 9,613,545 B2
(45) Date of Patent: Apr. 4, 2017

(54) KIT FOR SIMULATED ANIMAL SPAYING

(71) Applicant: Kimberly Jean Alexander, Naples, FL (US)

(72) Inventor: Kimberly Jean Alexander, Naples, FL (US)

( * ) Notice: Subject to any disclaimer, the term of this patent is extended or adjusted under 35 U.S.C. 154(b) by 258 days.

(21) Appl. No.: 14/542,117

(22) Filed: Nov. 14, 2014

(65) Prior Publication Data

US 2015/0332609 A1  Nov. 19, 2015

Related U.S. Application Data

(60) Provisional application No. 61/994,638, filed on May 16, 2014.

(51) Int. Cl.
  G09B 23/28 (2006.01)
  G09B 23/36 (2006.01)

(52) U.S. Cl.
  CPC .......... G09B 23/36 (2013.01); *G09B 23/281* (2013.01)

(58) Field of Classification Search
  USPC ....... 434/219, 255, 262, 267, 269, 272, 273, 434/295, 296, 297
  See application file for complete search history.

(56) References Cited

U.S. PATENT DOCUMENTS

| | | | | |
|---|---|---|---|---|
| 4,822,285 A * | 4/1989 | Summerville | ......... | G09B 23/36 434/272 |
| 5,702,027 A * | 12/1997 | Barry | ......... | B65G 69/165 193/2 D |
| 5,727,948 A * | 3/1998 | Jordan | ......... | G09B 23/285 434/267 |
| 5,947,743 A * | 9/1999 | Hasson | ......... | G09B 23/286 434/262 |
| 5,957,694 A * | 9/1999 | Bunch | ......... | G09B 23/36 434/262 |
| 6,012,407 A * | 1/2000 | Farley | ......... | B63B 21/56 114/215 |
| 6,488,507 B1 * | 12/2002 | Stoloff | ......... | G09B 23/28 434/272 |
| 7,866,983 B2 * | 1/2011 | Hemphill | ......... | G09B 23/28 434/262 |
| 8,915,742 B2 * | 12/2014 | Hendrickson | ......... | G09B 23/303 434/267 |
| 2014/0030682 A1 * | 1/2014 | Thilenius | ......... | G09B 23/30 434/219 |

OTHER PUBLICATIONS

"The University of Sydney: Matrix and Veterinary Science Know-How Creates a Cutting-Edge Model", Apr. 10, 2012 [retrieved online Sep. 22, 2016].*

* cited by examiner

*Primary Examiner* — Kurt Fernstrom
(74) *Attorney, Agent, or Firm* — Dunlap Bennett & Ludwig PLLC

(57) ABSTRACT

A spaying simulation kit that allows students to practice a small animal surgical spay is provided. The spaying simulation kit includes an outer casing which may be suspended in a box. The outer casing includes a length, a width, a front end, a rear end, a top portion and a bottom portion. An internal housing is formed within the outer casing. An opening, such as a rectangular opening, may be cut through the outer casing and may thereby lead into the internal housing. The present invention may include at least one cord suspended within and running along a length of the internal housing. The cord includes a plurality of indicators that are indications of different portions of a female reproductive system.

11 Claims, 4 Drawing Sheets

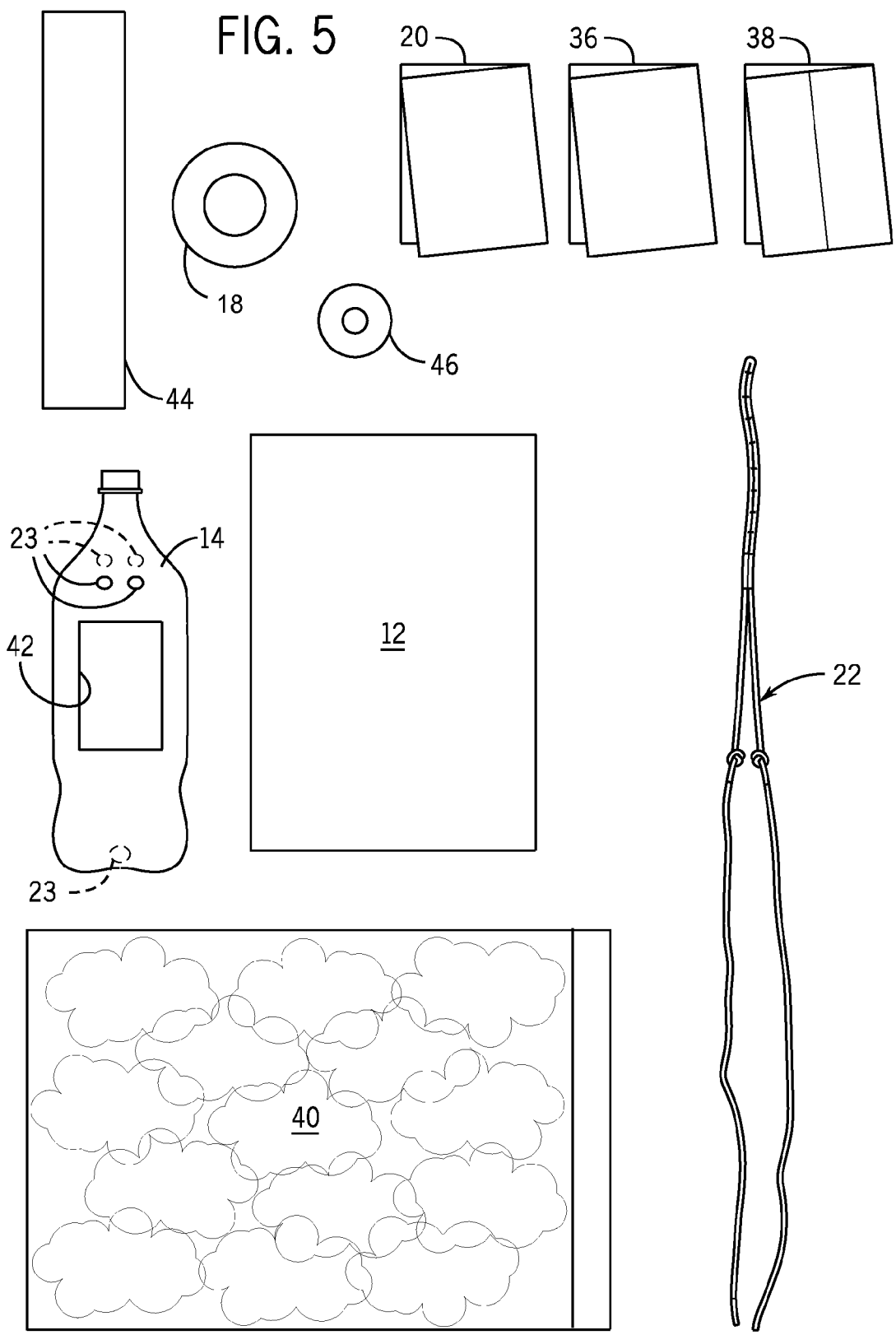

KIT FOR SIMULATED ANIMAL SPAYING

CROSS-REFERENCE TO RELATED APPLICATION

This application claims the benefit of priority of U.S. provisional application No. 61/994,638, filed May 16, 2014, the contents of which are herein incorporated by reference.

BACKGROUND OF THE INVENTION

The present invention relates to practicing animal spaying and, more particularly, to a kit for simulated animal spaying.

Veterinary students lack hands on opportunities to learn how to perform a small animal spay prior to performing a spay on a living patient. Current spay models are often very expensive, not easily maintained or reusable, and not always anatomically accurate. For these reasons, these models are not readily available to many veterinary students. Veterinary schools and students are limited on funding for labs and teaching. Therefore, having only expensive, poorly reproducible models is not conducive to their needs.

As can be seen, there is a need for an improved kit for simulated animal spaying.

SUMMARY OF THE INVENTION

In one aspect of the present invention, a spaying simulation kit comprises: an outer casing forming an internal housing within, wherein an opening is formed through the outer casing and leading into the internal housing; and at least one cord suspended within and running along a length of the internal housing, wherein the at least one cord comprises a plurality of indicators comprising indications of different portions of a female reproductive system.

These and other features, aspects and advantages of the present invention will become better understood with reference to the following drawings, description and claims.

BRIEF DESCRIPTION OF THE DRAWINGS

FIG. 5 is an elevation view of the components of the kit.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a kit that allows students to practice a small animal surgical spay. The present invention provides veterinary students with a cost effective modality to perform a small animal spay on a reasonably anatomically accurate model that is easily reusable. This spay model is extremely inexpensive and easy to reproduce while giving students a reasonably accurate representation of a small animal patient's anatomy. Students can perform the entire procedure to completion as they would perform it in a living patient and this procedure can be performed numerous times as the model is reusable.

Figure 1:
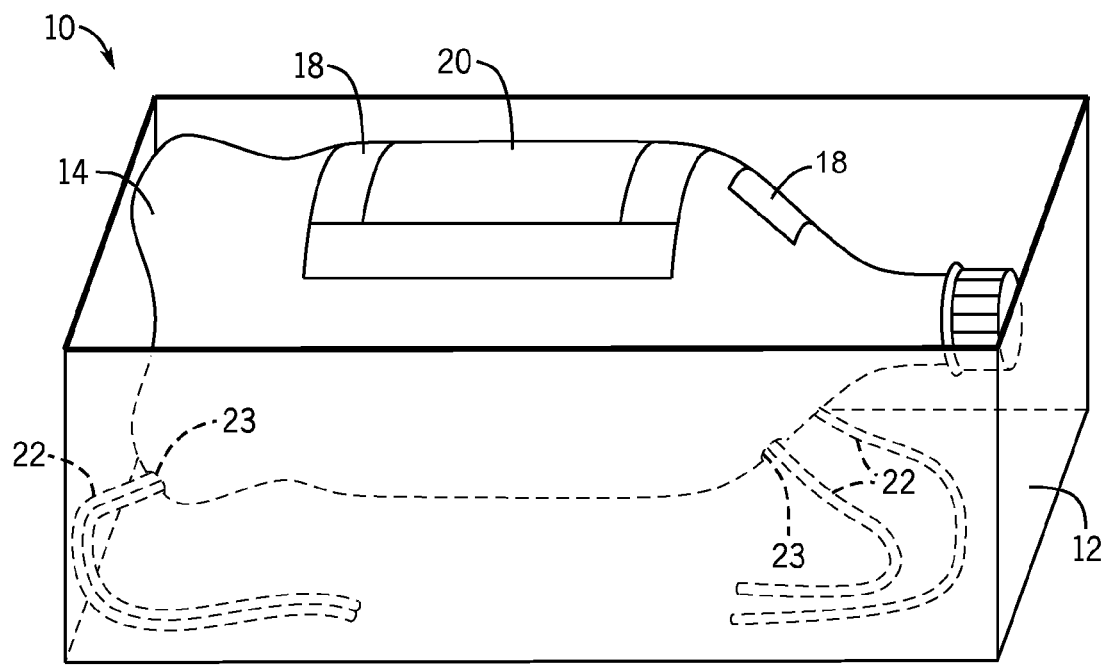
FIG. 1 is a perspective view of the present invention ready for use.
Figure 3:
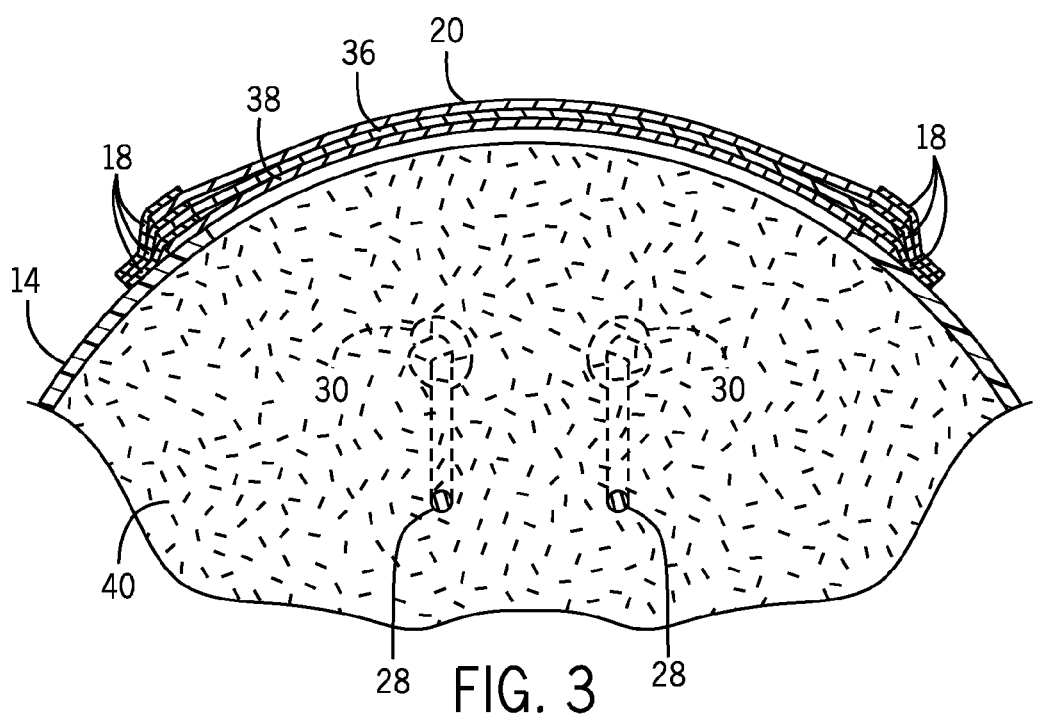
FIG. 3 is a cross-sectional view taken on line 3-3 of FIG. 2.
Figure 2:
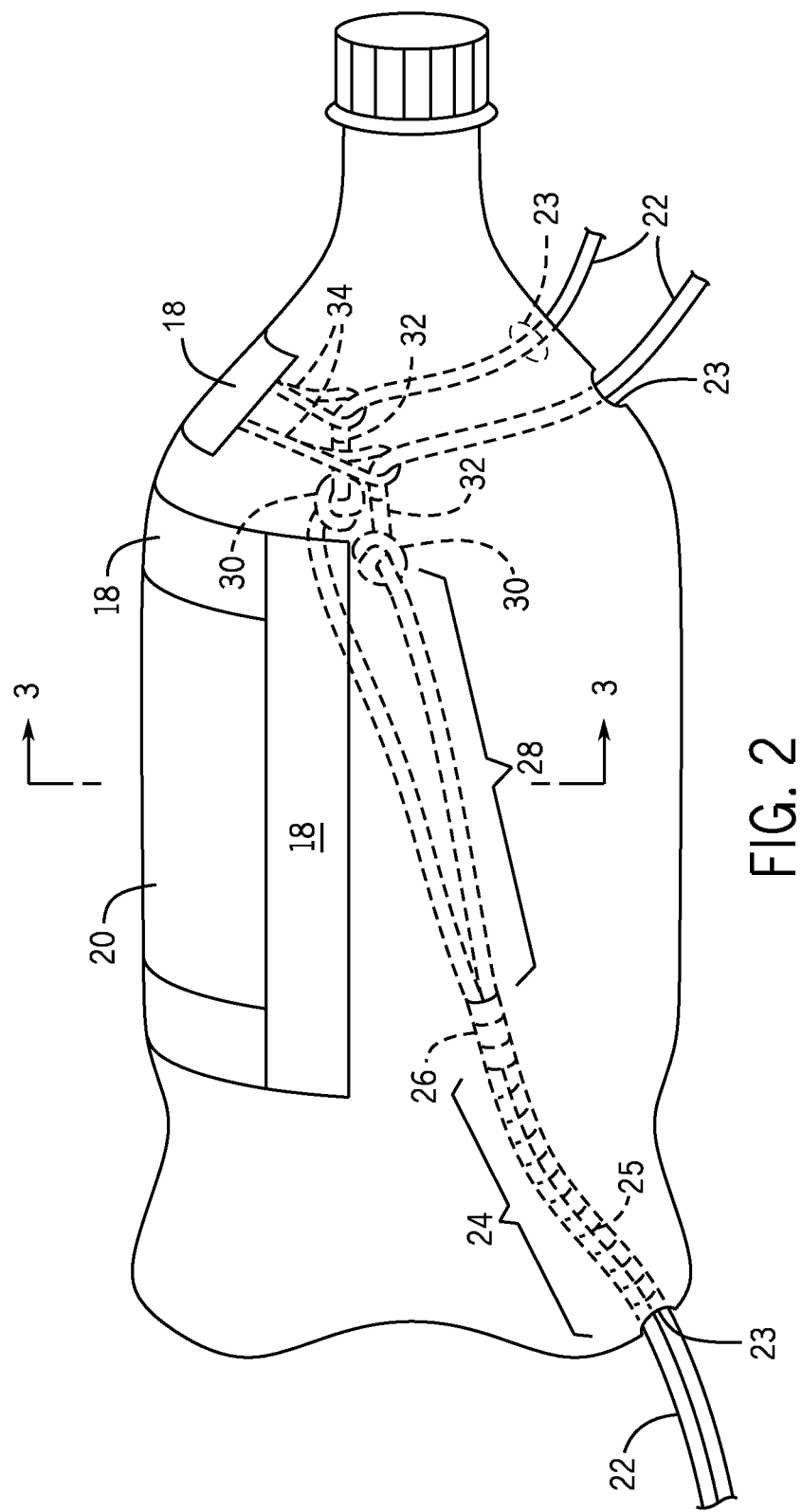
FIG. 2 is a perspective view of the present invention.
Figure 4:
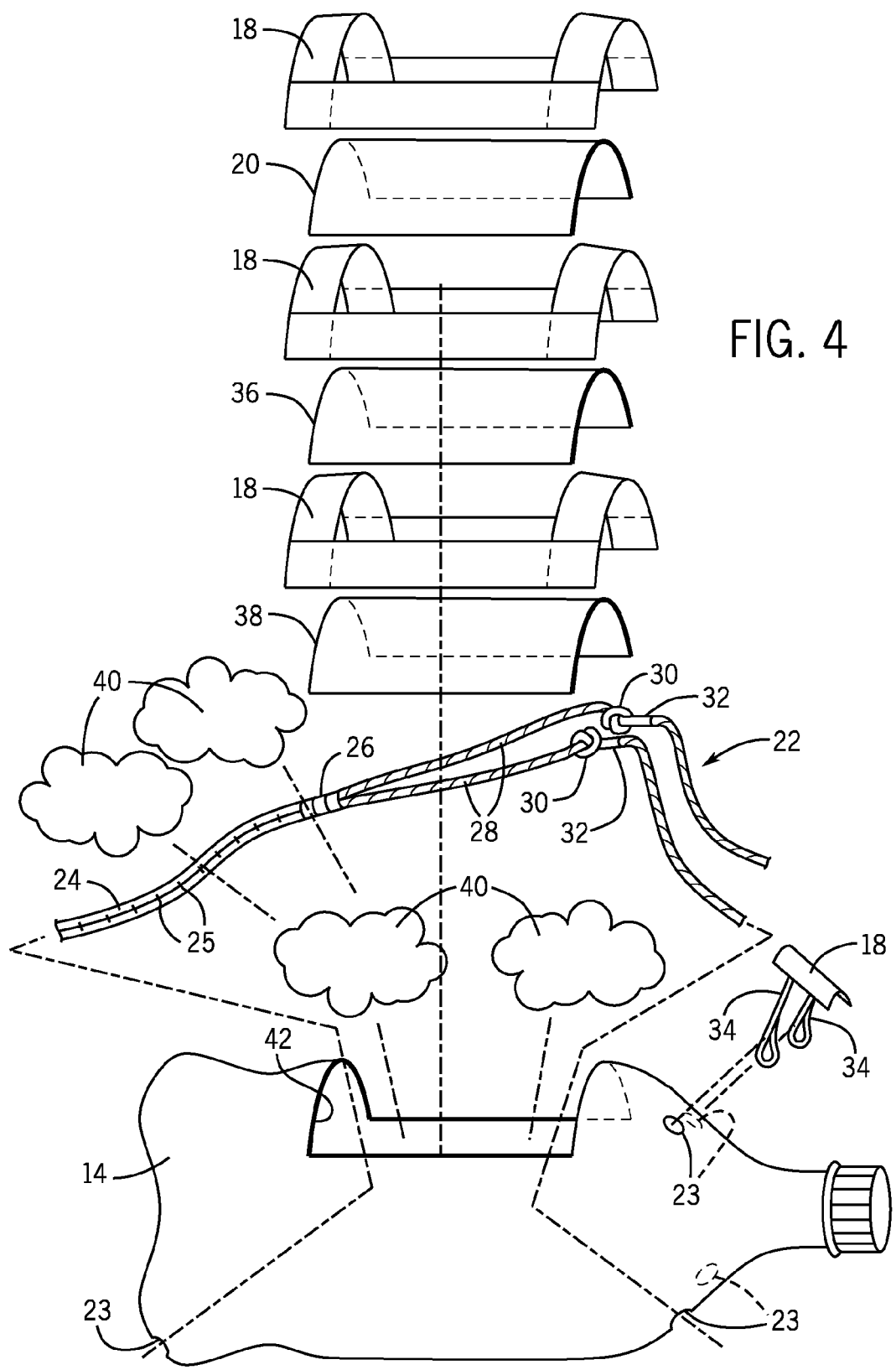
FIG. 4 is an exploded perspective view of the present invention.

Referring to FIGS. 1 through 5, the present invention includes a spaying simulation kit 10. The spaying simulation kit 10 includes an outer casing 14 which may be suspended in a box. The outer casing 14 includes a length, a width, a front end, a rear end, a top portion and a bottom portion. An internal housing is formed within the outer casing 14. An opening 42, such as a rectangular opening 42, may be cut through the outer casing 14 and may thereby lead into the internal housing. The present invention may include at least one cord 22 suspended within and running along a length of the internal housing. The cord 22 includes a plurality of indicators that are indications of different portions of a female reproductive system.

In certain embodiments, the present invention may include a fiber fill 40. The fiber fill 40 may include a polyester or cotton material. The fiber fill 40 may be within the internal housing of the outer casing 14. The fiber fill 40 may surround the at least one cord 22, simulating tissue of an animal patient.

The present invention may further include at least one sheet 20 that covers the opening 42. The at least one sheet 20 may be a foam sheet 20. The at least one sheet 20 may include a plurality of sheets 20, 36, 38 that represent different layers of tissue of the animal patient. The sheets 20, 36, 38 may be layered and attached to the outer casing 14 by tape 18. The plurality of foam sheets 20, 36, 38 include a first foam sheet 20 that represents a dermis of an animal, a second foam sheet 36 that represents a subcutaneous layer of an animal and a third foam sheet 38 that represents a muscular layer. The first foam sheet 20 may be brown, the second foam sheet 36 may be yellow, and the third foam sheet 38 may be red. The third foam sheet 36 may include an indicator of a linea alba, such as a white line.

In certain embodiments, the at least one cord 22 may include two cords 22 or one cord 22 that has been folded over. A first end of the cords 22 may be attached to the rear end of the outer casing through holes 23. A second end of the cords 22 may be attached to the front end of the outer casing through holes 23. The fiber fill 40 may support the cords 22 in a proper position within the internal housing.

As mentioned above, the two cords 22 may include a plurality of indicators along a length of the cords 22. For example, the two cords 22 may be attached to one another by sutures 25, which indicates the uterine body portion 24. A first tape 46 may be wrapped around the two cords indicating a cervix portion 26. A length of the two cords 22 may indicate a uterine horn portion 28. A knot may be made within each of the two cords 22 indicating an ovaries portion 30. A second tape 46 may be wrapped around each of the two cords 22 indicating a proper ligaments portion 32. The plurality of indicators described above is for exemplary purposes, and any indicators may be used to indicate the different portions of the female reproductive system.

The present invention may further include a first connector and a second connecter. The first and second connector may represent suspensory ligaments 34 of an animal patient. The first and second connectors may connect the at least one cord 22 to the outer casing 12 near the front end of the outer casing 12. The first and second connectors may be made of a tearable material, such as a plastic wrap 44. The first and second connectors may be attached to the outer casing 12 through holes 23 and tape 18.

The brown foam sheet, yellow felt sheet, and red foam sheet represents the abdominal wall layers of a small animal patient. The layers represent the dermal layer, subcutaneous layer, and muscular layer respectively. The white line in the red foam sheet represents the linea alba. The linea alba is an important landmark during a small animal spay procedure. The veterinary student can use a scalpel blade to make an abdominal mid-line incision through these layers which simulates how the procedure would be started on a living patient. Next, the student would use a snook hook or spay hook that can be introduced into the incision and guided along the outer casing wall (plastic bottle), turned, and then lifted back through the incision. The student may hook the nylon rope. The nylon rope represents the uterine horn of a small animal patient. The student can then trace the uterine horn to the proper ligament and ovary (approximately ¼ inch electrical tape and knot respectively). A clamp can be placed over the proper ligament. The student can then introduce her finger into the incision and follow the nylon rope beyond the ovary in order to palpate the suspensory ligament (plastic wrap piece). The student can then break the suspensory ligament with her finger in order to further exteriorize the ovary. The student can then ligate the ovarian pedical (nylon rope beyond the knot) using proper clamping technique and ligatures. The ovarian pedical can then be cut and the student can then release the ovarian pedical back into the abdomen (plastic bottle). The student can then follow the uterine horn (nylon rope) to its bifurcation in order to then follow the other free side of the nylon rope to the ¼ inch electrical tape and knot (proper ligament and ovary respectively). The same procedure that was performed on the first side can be performed on the second side. The student can then ligate the uterine body (the bifurcation of the nylon rope) using proper clamping and ligatures. The student may note the inch electrical tape approximately 1¼ inches from the bifurcation which represents the cervix which may not be included in their ligation. The uterine body can then be cut and removed. The student may then release the remaining uterine stump (remainder of sewn nylon rope) back into the abdomen (plastic bottle). The student can then close each layer of the abdominal wall with proper ligatures. Additionally, students can practice the various types of ligatures on the nylon rope and on the foam and felt sheets.

A method of making the present invention may include the following. Cut approximately a 2 in×3 in hole into a soda bottle at middle of bottle. Make four punctures through bottle at the 2, 4, 8, and 10 o'clock positions toward the capped end. Make a hole in the bottom of bottle. Using a 5.5 ft nylon rope folded in half, sew 7 in together beginning at the fold with 2-0 PDS suture. Around one inch from the end of the sewn aspect, place a piece of in white electrical tape to encircle the sewn rope. Within the left free rope strand, 6 inches from bifurcation, tie a simple knot. Within the right free rope strand, 5 and a half inches from the bifurcation, tie a simple knot. Next to each knot (side closest to the sewn portion of rope), encircle rope with a piece of white electrical tape. Tie a knot at each free end of the rope. Tie or tape the ends of two ⅜ in×5 in pieces of plastic wrap around the rope next to each knot (aspect nearest free end of rope). The assembled nylon rope is placed in bottle. The sewn end of the rope is passed through the hole in the bottom of the plastic bottle. The free end of the right rope is passed through the 4 o'clock hole. The free end of the left rope is passed through 8 o'clock hole. The plastic wrap pieces are each passed through their corresponding holes (2 and 10 o'clock) and the ends duct taped to the bottle. The plastic bottle is filled with the polyester fiberfill. A white pen may be used to make an indented, white line down the center of a 6 inch by 4½ inch red foam sheet, evenly bisecting the red foam sheet along its long axis. Place red foam sheet over the 2 in×3 in hole in the bottle. Tape the red foam sheet by overlaying the duct tape on all four sides of the foam sheet, attaching to the bottle, and leaving the center of the foam sheet free of tape. A yellow felt sheet and brown foam sheet are sequentially overlaid and taped to the bottle.

The model of the present invention allows the individual to try different types of ligatures (circumferential, transfixation, Miller's knot, Modified Miller's knot, simple continuous, simple interrupted) and practice both ovariohysterectomy and ovariectomy. In alternate embodiments, an element to simulate the broad ligament could be added. A simple drawing of an oval on the brown foam pad to represent the umbilicus could be added. Finally, elements to represent vasculature could be added. In alternate embodiments, the present invention may be converted into a computer simulation to allow students to perform the procedure through a computer model. This could potentially help students to visualize the procedure prior to working on the physical model or prior to performing the procedure on a patient.

It should be understood, of course, that the foregoing relates to exemplary embodiments of the invention and that modifications may be made without departing from the spirit and scope of the invention as set forth in the following claims.

What is claimed is:

1. A spaying simulation kit comprising:
   an outer casing forming an internal housing within, wherein an opening is formed through the outer casing and leading into the internal housing;
   at least one cord suspended within and running along a length of the internal housing, wherein the at least one cord comprises a plurality of indicators comprising indications of different portions of a female reproductive system; and
   a fiber fill within the internal housing and surrounding the at least one cord.

2. The spaying simulation kit of claim 1, further comprising at least one foam sheet attached to the outer casing and covering the opening.

3. The spaying simulation kit of claim 2, wherein the at least one foam sheet comprises a plurality of foam sheets.

4. The spaying simulation kit of claim 3, wherein the plurality of foam sheets comprises a first foam sheet that represents a dermis of an animal, a second foam sheet that represents a subcutaneous layer of an animal and a third foam sheet that represents a muscular layer, wherein the third foam sheet comprises an indicator of a linea alba.

5. The spaying simulation kit of claim 4, wherein the first foam sheet is brown, the second foam sheet is yellow, and the third foam sheet is red.

6. The spaying simulation kit of claim 4, wherein the indicator of a linea alba is a white line.

7. The spaying simulation kit of claim 1, wherein the outer casing comprises a length, a width, a front end, a rear end, a top portion and a bottom portion.

8. The spaying simulation kit of claim 7, wherein the at least one cord comprises two cords, wherein the two cords comprise the plurality of indicators along a length of the two cords comprising:
   an attachment of the two cords near the rear end indicating a uterine body portion;
   a first tape wrapped around the two cords indicating a cervix portion;

a length of the two cords indicating a uterine horn portion;
a knot within each of the two cords indicating an ovaries portion; and
a second tape wrapped around each of the two cords indicating a proper ligaments portion.

9. The spaying simulation kit of claim 8, further comprising a first connector and a second connecter, wherein the first and second connector represent suspensory ligaments, wherein the first and second connectors connect the at least one cord to the outer casing near the front end of the outer casing.

10. A spaying simulation kit comprising:
an outer casing forming an internal housing within, wherein an opening is formed through the outer casing and leading into the internal housing;
at least one cord suspended within and running along a length of the internal housing, wherein the at least one cord comprises a plurality of indicators comprising indications of different portions of a female reproductive system; and
at least one foam sheet attached to the outer casing and covering the opening.

11. A spaying simulation kit comprising:
an outer casing comprising a length, a width, a front end, a rear end, a top portion and a bottom portion, wherein the outer casing comprises an internal housing within, wherein an opening is formed through the outer casing and leading into the internal housing;
two cords suspended within and running along a length of the internal housing, wherein the two cords comprise:
an attachment of the two cords near the rear end indicating a uterine body portion;
a first tape wrapped around the two cords indicating a cervix portion;
a length of the two cords indicating a uterine horn portion;
a knot within each of the two cords indicating an ovaries portion; and
a second tape wrapped around each of the two cords indicating a proper ligaments portion.

* * * * *